No. 775,601. PATENTED NOV. 22, 1904.
I. GOLDSTEIN.
SLICER FOR BREAD, &c.
APPLICATION FILED MAY 11, 1904.
NO MODEL.
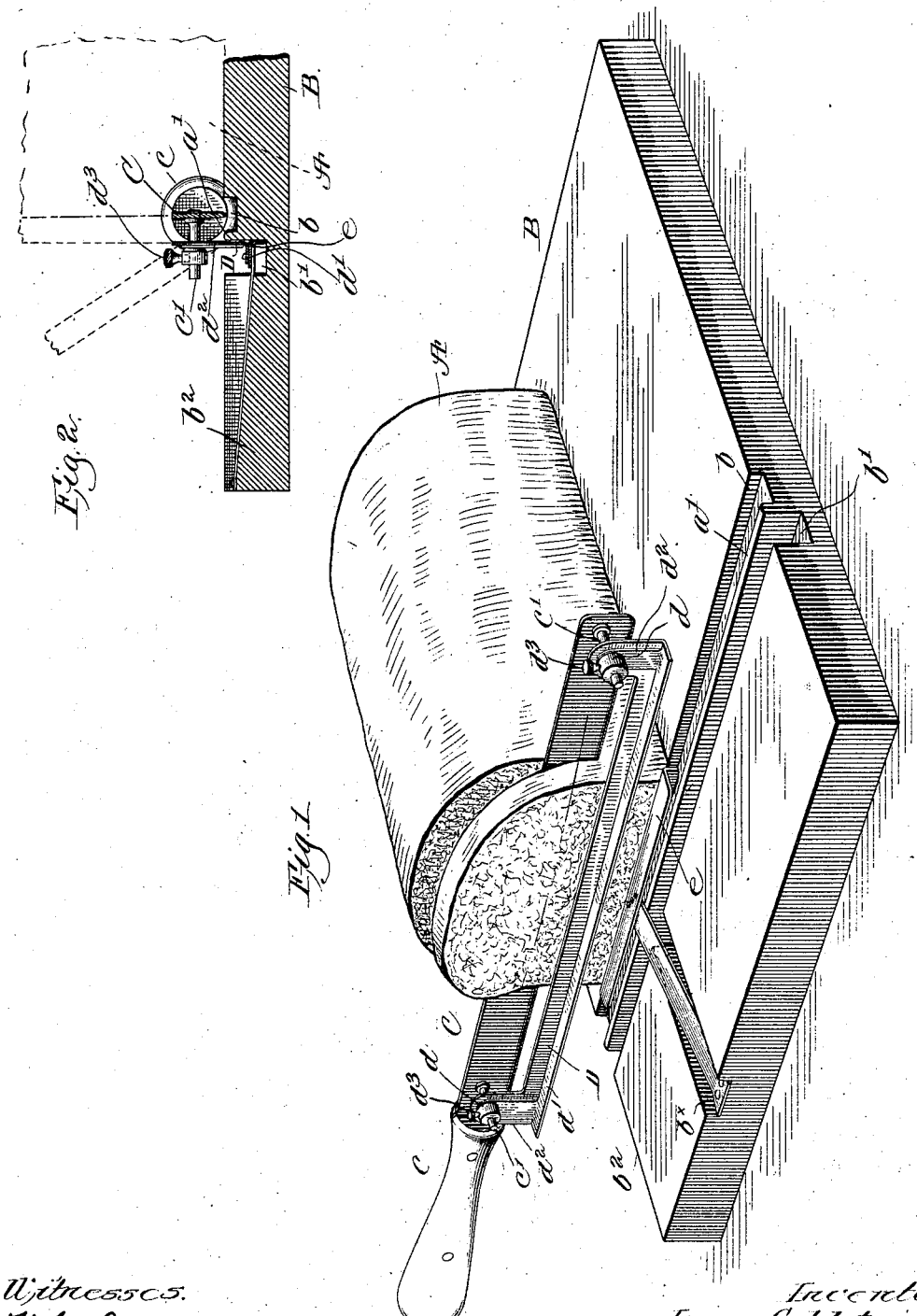
Witnesses:
W. C. Lunsford
S. W. Lutton
Inventor:
Isaac Goldstein,
by Crosby Gregory
Attys.

No. 775,601. Patented November 22, 1904.

UNITED STATES PATENT OFFICE.

ISAAC GOLDSTEIN, OF BOSTON, MASSACHUSETTS.

SLICER FOR BREAD, &c.

SPECIFICATION forming part of Letters Patent No. 775,601, dated November 22, 1904.

Application filed May 11, 1904. Serial No. 207,442. (No model.)

*To all whom it may concern:*

Be it known that I, ISAAC GOLDSTEIN, a citizen of the United States, residing at Boston, county of Suffolk, State of Massachusetts, have invented an Improvement in Slicers for Bread, &c., of which the following description, in connection with the accompanying drawings, is a specification, like letters on the drawings representing like parts.

This invention has for its object the production of a novel bread-slicer whereby the thickness of the slice may be determined accurately.

Figure 1 in perspective shows my novel bread-slicer as taking off a slice of bread. Fig. 2 is a view showing part of the apparatus with the knife in its lowest position, it having passed through the bottom crust of the loaf.

The loaf A to be sliced will be placed on the slicing-board B, having a knife-receiving groove $b$ and a gage-receiving groove $b'$, the board being preferably extended to form a slice-receiving portion $b^2$.

The knife C has a handle $c$, and extended from the blade of the knife are guiding-studs $c'$. These studs receive over them bosses $d$ of a guard D, comprising, as shown, an angle-shaped foot $d'$ and arms $d^2$, carrying said bosses. The guard may be adjusted toward and from the blade of the knife according to the thickness of slice desired to be cut, the guard being held in adjusted position by set-screws $d^3$. The slice-sustaining portion $b^2$ has also a groove $b^\times$, and this groove and the groove $b'$ receive a yielding or spring-sustained gage $e$, the face of which serves to position the end of the loaf from which the slice is next to be cut. This gage occupies its elevated position throughout most of the time that the blade is cutting a slice from the loaf; but as said blade approaches the bottom of the loaf the foot of the guard meets the upper side of the gage and depresses the same, as shown in Fig. 2, into the groove $b'$. By the time, however, that the blade passes fully through the bottom crust of the loaf the upper edge of the foot of the guard passes below the upper edge of the projection $a'$, and immediately the slice falls onto the portion $b^2$ of the board B, crossing the guard as well as the gage. A slice having been cut from the loaf, the knife will be lifted and the gage will rise into position to again receive the end of the loaf against it preparatory to cutting another slice.

I have illustrated my invention as a bread-slicer; but it will be obvious that I may slice any material that is capable of being sliced—such as cake, Bologna sausage, or like material—and I use the term "board" to describe the foundation upon which the loaf or other thing to be sliced is sustained while being sliced, and it will be obvious that this may be made of wood, metal, or any other substance.

Having described my invention, what I claim as new, and desire to secure by Letters Patent, is—

1. In a slicer, a board to sustain the article to be sliced, and having a groove, a spring-sustained gage carried by the board and adapted to be depressed into said groove, a blade having a guard, said guard being provided with an angular foot, and adapted to depress the gage as the blade completes the slicing operation.

2. In a slicer, a board to sustain the article to be sliced having a knife-receiving groove and a gage-receiving groove, a spring-sustained gage carried by the board and adapted to be depressed into the gage-receiving groove, a knife having a guard, said guard being provided with an angular foot for engaging and depressing the gage into the gage-receiving groove as the knife passes into the knife-receiving groove.

3. In a slicer, a board to sustain the article to be sliced and having a knife-receiving groove and a gage-receiving groove, said grooves being separated by a projecting portion between them, a spring-sustained gage carried by the board and adapted to be depressed into the gage-receiving groove, a knife having a guard, said guard being provided with an angular foot, the upper edge of which is disposed substantially in line with the cutting edge of the knife and the lower angular portion of the guard adapted to contact with and depress the gage into the gage-receiving groove as the knife completes the slicing stroke and enters the knife-receiving groove.

4. In a slicer, a board upon which the article to be sliced is adapted to be supported, said board having knife and gage receiving grooves, and a slice-receiving portion extended beyond said grooves, a groove disposed in the slice-receiving portion of the board and at right angles to the knife and gage receiving grooves, a spring disposed in said groove and a gage sustained by said spring.

In testimony whereof I have signed my name to this specification in the presence of two subscribing witnesses.

ISAAC GOLDSTEIN.

Witnesses:
    MARGARET A. DUNN,
    GEO. W. GREGORY.